US010464848B2

(12) United States Patent
Stendera et al.

(10) Patent No.: US 10,464,848 B2
(45) Date of Patent: Nov. 5, 2019

(54) REFRACTORY BINDER SYSTEM

(71) Applicant: VESUVIUS USA CORPORATION, Champaign, IL (US)

(72) Inventors: James W. Stendera, Pittsburgh, PA (US); Ryan Hershey, Pittsburgh, PA (US)

(73) Assignee: VESUVIUS USA CORPORATION, Champaign, IL (US)

( * ) Notice: Subject to any disclaimer, the term of this patent is extended or adjusted under 35 U.S.C. 154(b) by 0 days.

(21) Appl. No.: 15/881,262

(22) Filed: Jan. 26, 2018

(65) Prior Publication Data

US 2018/0148377 A1    May 31, 2018

Related U.S. Application Data

(63) Continuation of application No. 15/300,545, filed as application No. PCT/US2015/021141 on Mar. 18, 2015, now Pat. No. 9,878,953.
(Continued)

(51) Int. Cl.
*C04B 35/10* (2006.01)
*C04B 33/13* (2006.01)
(Continued)

(52) U.S. Cl.
CPC .......... *C04B 33/1305* (2013.01); *C04B 33/04* (2013.01); *C04B 35/10* (2013.01);
(Continued)

(58) Field of Classification Search
CPC ......... C04B 26/04; C04B 14/06; C04B 14/30; C04B 24/425; C04B 40/0028
See application file for complete search history.

(56) References Cited

U.S. PATENT DOCUMENTS 2,768,992 A * 10/1956 Zukas ................... C08G 59/50
                                                         523/216
3,021,234 A *  2/1962 Casement ............. C08G 59/42
                                                         427/116
(Continued)

FOREIGN PATENT DOCUMENTS

CA           2124488 A1    11/1994
CN         101010367 A      8/2007
(Continued)

OTHER PUBLICATIONS

Shuichi Iwao, "Encyclopedia of Clay", p. 225, left column, lines 7 to 26, Asakura Publishing Co., Ltd., Tokyo, Japan.
(Continued)

*Primary Examiner* — Noah S Wiese
(74) *Attorney, Agent, or Firm* — Thomas Clinton; Donald M. Satina

(57) ABSTRACT

A refractory formulation containing an anhydrous solvent, an oleophilic rheology modifier and a refractory aggregate exhibits non-thermoplastic behavior, and remains plastic and formable at temperatures in the range of 10 degrees Celsius to 180 degrees Celsius. The oleophilic rheology modifier may effectively bind with the solvent to create a gel-like structure with organic solvents with moderate to high polarity. A phyllosilicate clay that has been treated with a quaternary fatty acid amine may be used as the oleophilic rheology modifier.

17 Claims, 7 Drawing Sheets

Related U.S. Application Data

(60) Provisional application No. 61/994,305, filed on May 16, 2014.

(51) Int. Cl.
| | |
|---|---|
| *C10M 113/10* | (2006.01) |
| *C10M 169/04* | (2006.01) |
| *C04B 33/04* | (2006.01) |
| *C04B 35/14* | (2006.01) |
| *C04B 35/565* | (2006.01) |
| *C04B 35/63* | (2006.01) |
| *C04B 35/632* | (2006.01) |
| *C04B 35/634* | (2006.01) |
| *C04B 35/66* | (2006.01) |

(52) U.S. Cl.
CPC ............ *C04B 35/14* (2013.01); *C04B 35/565* (2013.01); *C04B 35/632* (2013.01); *C04B 35/6303* (2013.01); *C04B 35/634* (2013.01); *C04B 35/63444* (2013.01); *C04B 35/63488* (2013.01); *C04B 35/63496* (2013.01); *C04B 35/66* (2013.01); *C10M 113/10* (2013.01); *C10M 169/04* (2013.01); *C04B 2235/3217* (2013.01); *C04B 2235/3232* (2013.01); *C04B 2235/349* (2013.01); *C04B 2235/3418* (2013.01); *C04B 2235/3826* (2013.01); *C04B 2235/3852* (2013.01); *C04B 2235/3873* (2013.01); *C04B 2235/422* (2013.01); *C04B 2235/424* (2013.01); *C04B 2235/428* (2013.01); *C04B 2235/48* (2013.01); *C04B 2235/5427* (2013.01); *C04B 2235/5436* (2013.01); *C10M 2201/061* (2013.01); *C10M 2201/10* (2013.01); *C10M 2201/102* (2013.01); *C10M 2201/103* (2013.01); *C10M 2201/105* (2013.01); *C10M 2203/10* (2013.01); *C10M 2203/102* (2013.01); *C10M 2203/104* (2013.01); *C10M 2203/108* (2013.01); *C10M 2203/1025* (2013.01); *C10M 2203/1045* (2013.01); *C10M 2207/02* (2013.01); *C10M 2207/022* (2013.01); *C10M 2207/0203* (2013.01); *C10M 2207/0225* (2013.01); *C10M 2207/08* (2013.01); *C10M 2207/085* (2013.01); *C10M 2207/28* (2013.01); *C10M 2207/2805* (2013.01); *C10M 2207/40* (2013.01); *C10M 2207/401* (2013.01); *C10M 2217/028* (2013.01); *C10N 2210/03* (2013.01); *C10N 2210/04* (2013.01); *C10N 2210/08* (2013.01); *C10N 2220/022* (2013.01); *C10N 2230/02* (2013.01); *C10N 2240/58* (2013.01)

(56) References Cited

U.S. PATENT DOCUMENTS

| | | | | |
|---|---|---|---|---|
| 4,558,075 | A | * | 12/1985 | Suss ............... C08K 9/04 523/216 |
| 4,980,401 | A | * | 12/1990 | Hinden ............ C04B 26/04 523/216 |
| 5,069,714 | A | | 12/1991 | Gosselin |
| 6,281,266 | B1 | | 8/2001 | Takeda et al. |
| 9,028,606 | B2 | | 5/2015 | Andersen et al. |
| 2004/0157724 | A1 | | 8/2004 | Doza et al. |
| 2008/0139729 | A1 | | 6/2008 | Wang et al. |
| 2009/0071293 | A1 | | 3/2009 | Juma |
| 2010/0222201 | A1 | | 9/2010 | Teiken |
| 2010/0300053 | A1 | | 12/2010 | Alary |
| 2017/0204011 | A1 | | 7/2017 | Stendera et al. |

FOREIGN PATENT DOCUMENTS

| | | | | |
|---|---|---|---|---|
| CN | 101257957 | A | | 9/2008 |
| CN | 101903306 | A | | 12/2010 |
| CN | 102712103 | A | | 10/2012 |
| CN | 103406489 | A | | 11/2013 |
| CN | 103772913 | A | * | 5/2014 ............ C08L 63/02 |
| CN | 103772913 | A | | 5/2014 |
| DE | 3437385 | A1 | | 5/1985 |
| GB | 276016 | A | | 12/1927 |
| GB | 2196331 | B | | 8/1990 |
| JP | H10259067 | A | | 9/1998 |
| JP | 3389572 | B2 | | 2/2003 |
| JP | 2009249193 | A | | 10/2009 |
| JP | 2009-292692 | A | | 12/2009 |
| JP | 2011-213521 | A | | 10/2011 |
| RU | 2514028 | C1 | | 4/2014 |
| RU | 2514032 | C1 | | 4/2014 |

OTHER PUBLICATIONS

Kumbar et al., "Flow Behavior of Petrol, Bio-ethanol and Their Blends", Acta Universitatis Agriculturae et Silviculturae Mendelianae Brunensis, 2012, vol. 60, No. 6, pp. 211-216.

Information Center of Ministry of Land and Resources, "Annual Review of World Mineral Resources 2008-2009", 2010-2011, pp. 355-356, Geological Publishing House.

* cited by examiner

REFRACTORY BINDER SYSTEM

CROSS-REFERENCE TO RELATED APPLICATIONS

This application is a continuation of U.S. application Ser. No. 15/300,545 filed Sep. 29, 2016, which is the U.S. national phase entry of international application PCT/US2015/021141, filed Mar. 18, 2015, which claims priority from U.S. provisional application Ser. No. 61/994,305, filed May 16, 2014; the entire teachings of these applications are incorporated herein by reference.

BACKGROUND OF THE INVENTION

Field of the Invention

This invention relates to refractory aggregate systems or formulations for use in applications where specific viscoplastic properties are required. Such systems or formulations find use as, for example, anhydrous taphole closure materials; a low viscosity organic liquid is used in combination with an oleophilic rheology modifier to impart the needed consistency to the material so that it can be effectively used.

Plasticity is a term that relates to the deformation of a material undergoing non-reversible changes of shape in response to applied forces. A thermoplastic material is a material that becomes softer and more moldable as the temperature increases but returns to a harder, more solid-like, state as the temperature decreases. A viscoplastic material or Bingham material behaves as a rigid body at low stresses, but flows as a viscous fluid under high stresses.

Mixtures of coal tar or petroleum tar and pitches or phenolic resins have been used in refractory aggregate systems or formulations. These tars, pitches, or resins are combined with a large amount of fine particulates which increase fluid friction, and create a very viscous thermoplastic material. The result is a material with pseudoplastic properties, with a consistency that mimics a true viscoplastic material, which can be applied through a mud gun and other equipment well known in the art to effect closure of an open blast furnace taphole. These materials exhibit highly thermoplastic behavior and are not truly viscoplastic materials. High viscosity liquids exhibit a large change in viscosity as their temperatures change; this property is imparted to mixtures containing them. It is difficult to prepare a formulation of conventional materials that can be pushed in a mud gun when cold while still being stiff enough to stop the iron in the hole when heated. Conventional formulations also exhibit a very narrow range of plasticity as a function of liquid content. One way of increasing the useful range of conventional formulations is to add large quantities of very fine particles. This leads to constriction of channels between the particles, making it more difficult for gases of pyrolyzation to escape when a refractory piece made from the formulation is put into use.

Thermoplastic materials have utility ranges that are limited at both ends for the application of this invention. The current taphole closure materials contain both coal tar and coal tar pitch or both petroleum tar and petroleum pitch and/or phenolic resin with or without organic solvents. This type of binding system develops plasticity when the material is heated giving the material a soft, clay like, consistency at the application temperature. The lower temperature limit of the utility range is the temperature at which the mixture is too stiff to be pushed by the mud gun and flow down the taphole to plug it. In some cases mixture stiffness leads to "short taphole," the condition of the plug not having the desired thickness or, in extreme cases, to a situation in which the mud gun cannot even push the material out of the nose. The upper temperature limit of the utility range is the point at which the mixture starts to cure due either to evaporation of volatiles, polymerization, or carbonization of the organic portion of the mixture.

In aqueous systems it is well known in the art that viscoplasticity is developed in a refractory system by the use of water, which has low viscosity and low thermoplastic nature. However, aqueous systems may have the disadvantage of exhibiting a large change in plasticity as a result of a small change in liquid content. Aqueous systems may also have the property of reacting explosively with iron.

Water activated rheology modifiers such as clay, when dispersed in an aqueous environment, loosely interact to give the refractory mass a clay-like viscoelastic consistency. Such systems are well known in the art but have not been applied to non-aqueous refractory systems for use as taphole closure materials. Rheology modifiers behave differently with non-aqueous solvents than they do with water. The process of controlling solid-solid interactions in non-aqueous systems differs greatly from the process of controlling those interactions in water. In addition, there is a vast selection of liquids, having a vast range of properties, to be considered in the production of non-water/solid refractory systems.

BRIEF SUMMARY OF THE INVENTION

This invention relates to refractory aggregate systems or formulations for use in applications where specific viscoplastic properties are required. The systems or formulations may be used, for example, to modify blast furnace taphole closure materials by employing a non-aqueous low viscosity liquid and an oleophilic rheology modifier which interacts with the liquid to induce the needed viscoplasticity for the initial application of the clay. The force required to extrude a refractory formulation of the present invention through an orifice exhibits less variation with respect to a change in the amount of liquid present than does a formulation of the prior art.

Temperatures at which a refractory formulation of the present invention are applied are typically at or between 10 degrees Celsius and 125 degrees Celsius. The final use temperature of a refractory formulation of the present invention is usually about 1540 degrees Celsius, the temperature of molten iron, but can be much higher in ferroalloy applications.

A refractory formulation according to the invention may constitute an anhydrous liquid, a refractory aggregate, and an oleophilic rheology modifier such as an organoclay or a polymer.

The anhydrous liquid may have a viscosity less than 10,000, 5,000, 3,000 or 1500 centipoise as measured at 10 degrees Celsius. The anhydrous liquid may have a viscosity greater than 1, 10 or 100 centipoise as measured at 10 degrees Celsius. It may be selected from polyunsaturated fats, aliphatic hydrocarbons, aromatic hydrocarbons, alcohols, aldehydes, esters, ketones, and combinations thereof. Materials that may be used in the anhydrous liquids include tall oil, ethylene glycol, glycerin, propylene glycol, linseed oil, soybean oil and combinations thereof. The anhydrous liquid may be present in the wet formulation, also described as the total formulation of liquids and solids, in an amount in the range from and including 2 wt % to and including 40 wt %, 3 wt % to 35 wt %, or 4 wt % to 30 wt %. Low values of viscosity and thermoplasticity are desirable properties for the anhydrous liquid. Certain suitable anhydrous liquids exhibit an increase in viscosity in the range from 10 to 6,000 centipoise (cP) when subjected to a decrease in temperature from 65 degrees Celsius (150 degrees Fahrenheit) to 10 degrees Celsius (50 degrees Fahrenheit). Certain suitable liquids exhibit a change in viscosity that is less than a factor of 2, 4, 6, 8, 10 or 50 as a result of a temperature change from 10 degrees C. to 100 degrees C. Propylene glycol, a suitable anhydrous liquid, exhibits a decrease in viscosity from 35 centipoise to 10 centipoise from 27 degrees Celsius to 49 degrees Celsius. Other suitable anhydrous liquids may have viscosities less than 50,000 cP, less than 40,000 cP, or less than 30,000 cP at 27 degrees Celsius.

The oleophilic rheology modifier may be present in the formulation in an amount in the range from and including 0.2 wt % to and including 50 wt %, 0.5 wt % to 45 wt %, 0.5 wt % to 20 wt %, 0.5 wt % to 10 wt %, 0.5 wt % to 5 wt %, 1 wt % to 40 wt %, 1 wt % to 20 wt %, 1 wt % to 5 wt %, 1 wt % to 4 wt %, or 2 wt % to 35 wt % as a percentage of the total formulation of liquids and solids. The oleophilic rheology modifier may contain organoclay, phyllosilicates, smectites, hectorite or montmorillonite, and combinations thereof. In terms of function, the oleophilic rheology modifier may effectively bind with the liquid to create a gel-like structure with organic liquids with moderate to high polarity such as diols, esters, ketones, glycol ethers, alcohols and some polar aromatic organic compounds. A combination of an oleophilic rheology modifier with a suitable liquid produces a formulation with an extrusion pressure that varies less with changes of the amount of liquid present than the extrusion pressure does in prior art formulations.

The organoclay is a type of phyllosilicate clay that has been treated with a quaternary fatty acid amine. The treatment process includes replacing the natural inorganic exchangeable metal cations with larger quaternary ammonium cations. The addition of a low viscosity liquid causes the large cations to spread apart. This effect of repulsion with the aggregate allows for the formation of a viscoplastic material.

The formulation of the present invention may include a polymer or polymers. Polymers are a type of chemical compound or mixture of compounds that consist of many repeating structures. The repeating structures are molecules with low molecular masses linked together by covalent chemical bonds. Biological examples of polymers include polysaccharides, cellulose and glycoproteins. Naturally-occurring examples of polymers include amber, wool, silk and natural rubber. Synthetic polymers include neoprene, nylon, polyvinyl chloride and polyethylene. A polymer that may be used in the inventive formulation is polyvinylpyrrolidone. The polymer may constitute from and including 0.2 wt % to and including 50 wt %, from and including 0.5 wt % to and including 45 wt %, from and including 1 wt % to and including 40 wt %, from and including 2 wt % to and including 35 wt % as a percentage of the total formulation of liquids and solids.

Resins are a special type of polymer because they are thermosetting or thermoplastic polymers. There are many types of resins that are both liquid and powder forms. Some examples but not limited to are phenolic novolac resins, phenolic resole resins, epoxy resins, polyester resins, epoxy-polyester hybrid resins, polyurethane resins, polyester, and acrylic. The resin may constitute from and including 0.2 wt % to and including 50 wt %, from and including 0.5 wt % to and including 45 wt %, from and including 1 wt % to and including 40 wt %, from and including 2 wt % to and including 35 wt % as a percentage of the total formulation of liquids and solids.

The refractory aggregates may include brown fused alumina, bauxite, clay, silica sand, silica, fumed silica and silicon carbide. In some embodiments of the invention, refractory aggregates other than silica make up at least 15% by weight of the refractory aggregates. In some embodiments of the invention, refractory aggregates are present in the wet formulation, or total formulation of liquids and solids, in an amount in the range from and including 5 wt % to and including 90 wt %, from and including 8 wt % to and including 85 wt %, from and including 10 wt % to and including 80 wt %, or from and including 75 wt % to and including 97 wt %.

In some embodiments of the invention, the weight ratio of oleophilic rheology modifier to anhydrous liquid is equal to or between a ratio of 1 part modifier to 50 parts liquid and 1 part modifier to 1 part liquid. In some embodiments of the invention, the weight ratio of oleophilic rheology modifier to anhydrous liquid is equal to or between a ratio of 1 part modifier to 40 parts liquid and 1 part modifier to 2 parts liquid. In some embodiments of the invention, the weight ratio of oleophilic rheology modifier to anhydrous liquid is equal to or between a ratio of 1 part modifier to 30 parts liquid and 1 part modifier to 3 parts liquid.

The refractory formulation of the invention may further contain a carbon binder, or carbonaceous binder. This carbon binder may be selected from coal tar, coal tar pitches, petroleum tar, petroleum tar pitches, resins, and combinations thereof. In certain embodiments of the invention, the carbon binder is present in the wet formulation, or total formulation of liquids and solids, in an amount in the range from and including 0.01 wt % to and including 20 wt %, from and including 0.1 wt % to and including 18 wt %, from and including 0.5 wt % to and including 16 wt %, or from and including 1 wt % to and including 15 wt %. The carbon binder may provide high temperature strength to the formulation.

A carbon binder is often used to develop high temperature strength in the refractory mass in service. In conventional materials the carbon binder also serves as the high viscosity liquid to give the material the needed application consistency. The liquid used in combination with the oleophilic rheology modifier may or may not interact with the carbon binder. In general, if the liquid is a solvent to the carbon binder and dissolves the carbon binder portion of the mix, the effect will be to increase the thermoplasticity of the resultant mixture. If liquid and carbon binder interactions are desired for any reason, the formulation of the invention can still be used to reduce the degree of thermoplasticity that would have been produced if the oleophilic rheology modifier were not used. With the oleophilic rheology modifier, a higher percentage of low-viscosity liquid can be added while still maintaining application consistency.

The refractory formulation of the invention may further comprise metal-containing substances. Metal-containing substances that may be used include aluminum, silicon, ferrosilicon, ferrosilicon nitride, titanium dioxide, and combinations thereof. In certain embodiments of the invention, the metal is present in the wet formulation, or total formulation of liquids and solids, in an amount in the range from and including 0.01 wt % to and including 10 wt %, from and including 0.01 wt % to and including 9.5 wt %, or from and including 0.5 wt % to and including 9 wt %.

The refractory formulation of the invention may further comprise fumed silica. In certain embodiments of the invention, fumed silica may be present in the wet formulation, or total formulation of liquids and solids, in an amount in the range from 0.01 wt % to 10 wt %, 0.01 wt % to 9 wt %, or 0.5 wt % to 8 wt %.

The formulation of the invention exhibits reduced thermoplastic behavior, and so it remains plastic and formable at lower temperatures in comparison to previous mixtures. Specifically, it remains plastic and formable at temperatures in the range of −10 degrees Celsius to 100 degrees Celsius. Additionally, the consistency of the material will be more consistent over a longer temperature range eliminating a variable in application and allowing more flexibility over temperature control of the mud gun.

BRIEF DESCRIPTION OF THE SEVERAL VIEWS OF THE DRAWING(S)

DETAILED DESCRIPTION OF THE INVENTION

Example I

Figure 1:
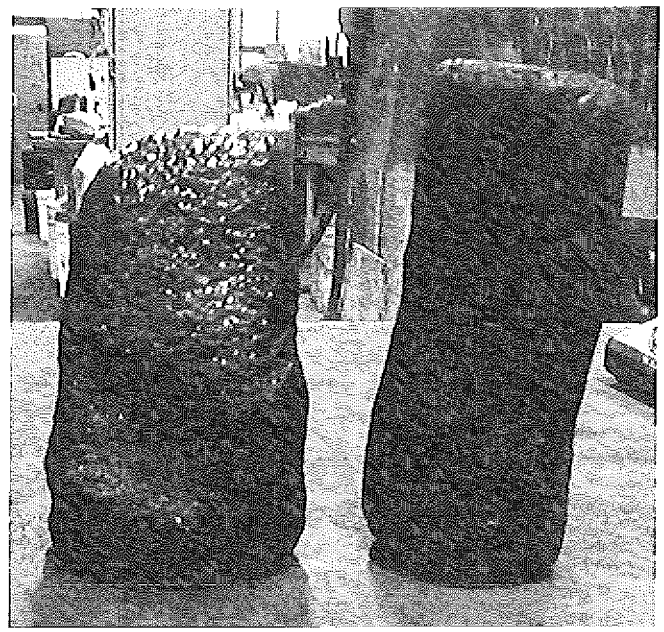
FIG. 1 is a photograph of a sample of the prior art and a sample of the present invention at the beginning of a slump test.
Figure 2:
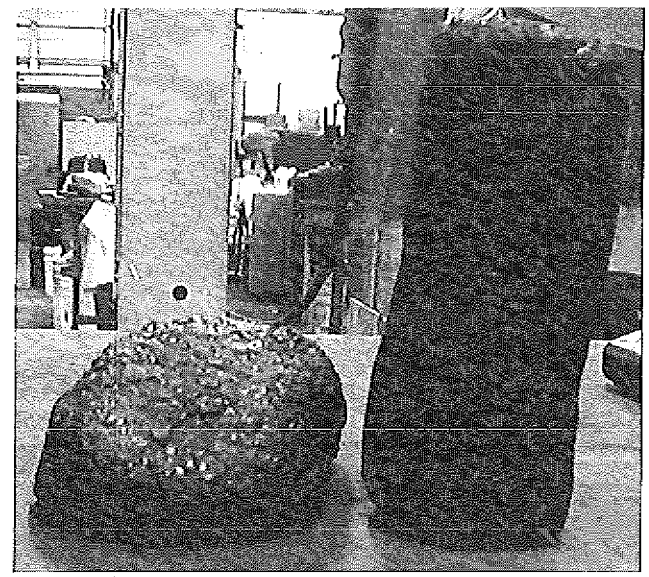
FIG. 2 is a photograph of a sample of the prior art and a sample of the present invention at the end of a slump test.

In a comparative example of the differences of properties of a formulation of the invention compared with a prior art formulation, two test materials were made with the same refractory aggregates. One test material employed an oleophilic rheology modifier and the other test material employed an oleophobic rheology modifier commonly used in the art. The low viscosity liquid used was propylene glycol and the amount of liquid was adjusted to reach a desired consistency. The oleophilic rheology modifier allowed the material to remain in a column behaving as a solid and the oleophobic material slowly flowed and slumped behaving as much like a viscous liquid. FIG. 1 shows a sample of the prior art at left, and a sample of the present invention at right at the initiation of the slump test. FIG. 2 shows a sample of the prior art at left, and a sample of the present invention at right at the conclusion of the slump test, after standing for 120 seconds. Table I shows the compositions of the two formulations in terms of weight percentages and grams per batch. Novalac phenolic resin is used in the prior art formulation and the inventive formulation. Oleophilic rheology modifier (Organoclay) gels with the organic liquid whereas the ball clay does not. Therefore, the formulation of the present invention required more liquid in order to be extrudable at the same extrusion pressure as the prior art formulation at a given temperature. Table II shows the heights of samples of the two formulations with respect to time. The sample of the formulation of the present invention showed no change in height, whereas the height of the sample of the prior art formulation decreased by 48.1% in 120 seconds. The slumping behavior of the prior art formulation sample is unsuitable for applications in which a cast piece must maintain its shape in a metallurgical vessel. In comparison to the prior art formulation, the inventive formulation maintains its application consistency over a larger temperature range without exhibiting liquid-like properties.

TABLE I

Composition of formulations tested in a slump test.

| Component | Prior Art Formulation | | Inventive Formulation | |
|---|---|---|---|---|
| | WT % | g/batch | WT % | g/batch |
| BAUXITE, CHINESE 6 × 16M | 34.167 | 3416.67 | 34.167 | 3416.67 |
| BLACK PLT SCRAP −14 + 0M | 25.500 | 2550.00 | 25.500 | 2550.00 |
| ALUMINA, BF, DCF | 5.833 | 583.33 | 5.833 | 583.33 |
| KYANITE, RAW −48M | 8.333 | 833.33 | 8.333 | 833.33 |
| SILICON CARBIDE #5 −200M | 7.500 | 750.00 | 7.500 | 750.00 |
| COKE −6 + 35M | 2.500 | 250.00 | 2.500 | 250.00 |
| COKE FINES, | 1.667 | 166.67 | 1.667 | 166.67 |
| CARBON BLACK | 1.667 | 166.67 | 1.667 | 166.67 |
| BALL CLAY | 2.167 | 216.67 | | |
| Oleophilic Rheology Modifier | | | 2.167 | 216.67 |
| PHENOLIC RESIN | 3.333 | 333.33 | 3.333 | 333.33 |
| PROPYLENE GLYCOL | 7.333 | 733.33 | 7.333 | 733.33 |
| TOTALS | 100.00 | 10000.00 | 100.00 | 10000.00 |
| ACTUAL AMOUNT OF PROPYLENE GLYCOL | | 706.83 grams | | 863.27 grams |

TABLE II

Slump Test Sample Heights

| Elapsed Time | Prior Art Formulation | Inventive Formulation |
|---|---|---|
| 0 sec | 7.8 cm | 9 cm |
| 120 sec | 4.05 | 9 cm |
| Percent Change | 48.1% | 0% |

Formulations according to the present invention have been prepared to duplicate or resemble the properties of prior art coal tar and petroleum tar bonded products, but have more thermoplasticity as measured by the extrusion pressure at lower temperatures. Mixtures of aggregate and low viscosity liquids generally change from coherent mass behavior to liquid behavior with the addition of a small amount of liquid. Addition of the oleophilic rheology modifier changes this behavior to a viscoplastic rheology. Batches were made with and without the oleophilic rheology modifier. Without the oleophilic rheology modifier, the temperature range between being too stiff to apply and much too fluid was very narrow. With the addition of the oleophilic rheology modifier the temperature range over which suitable fluidity was observed became much wider.

TABLE III

Extrusion Pressure (kPa) as a Function of Temperature

| ° C. | Inventive Formulation | Conventional | Inventive Formulation No Resin | Inventive Formulation with Resin & Polymer | Inventive Formulation with Tall Oil |
|---|---|---|---|---|---|
| −9.4 | 2151 | 4826 | 683 | 1875 | |
| 6.7 | 1669 | 3447 | 724 | 1165 | |
| 23.9 | 1200 | 2758 | 676 | 662 | |
| 37.8 | 820 | 1896 | 427 | 517 | 696 |
| 65.6 | 696 | 1303 | 414 | 896 | 510 |
| 93.3 | 248 | 496 | 462 | 1089 | 393 |
| 121.1 | 228 | 517 | 338 | 138 | 372 |
| 148.9 | 207 | 855 | 214 | 110 | 434 |
| 176.7 | 696 | 1441 | 524 | 103 | 903 |
| 204.4 | 3103 | 3792 | 593 | 2130 | 1813 |

Example II

A test material of the present invention composed of Chinese 90% alumina bauxite 59%, reactive alumina 6%, silicon carbide 7.5%, kyanite 8%, carbon binder consisting of various metals and carbon bearing materials 6.67%, resin 3.33%, oleophilic rheology modifier 2% and propylene glycol 7.5% was prepared. These ingredients were mixed in a conventional refractory mixer and extrusion pressures at various temperatures were measured using a modified Marshall tester used for extruding asphalt, commonly used in the asphalt industry. The die holding the material was maintained at a set temperature to maintain sample temperature. The default temperature for testing was 66° C. Testing results are shown in the first column of Table III; pressures are shown in kilopascals (kPa).

Figure 3:
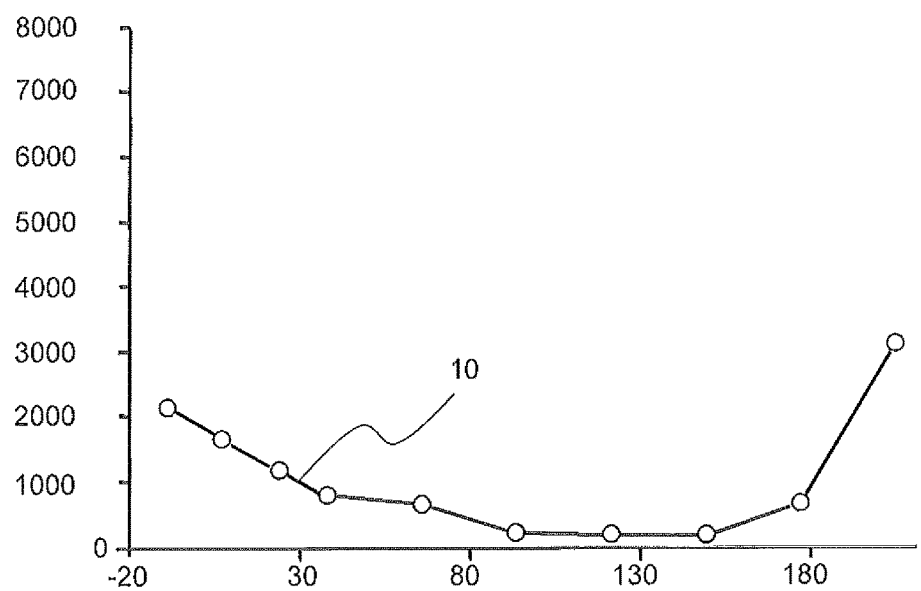
FIG. 3 is a plot of extrusion pressure of a sample of a formulation of the present invention with respect to temperature.

FIG. 3 is a graph depicting extrusion pressures as a function of temperature for this inventive formulation, which contains propylene glycol as a low viscosity solvent. Temperatures are shown in degrees Celsius on the horizontal axis. Pressures are shown in kilopascals (kPa) on the vertical axis. Plot 10 is a representation of pressure values. FIG. 3 shows that the inventive formulation has a low extrusion pressure, and is viscoplastic and formable, over a wide temperature range.

Example III

A test material, as known in the prior art, composed of Chinese 90% alumina bauxite 42.5%, alumina 10%, silicon carbide 7.5%, kyanite 3.33%, fume silica 6%, ball clay 10%, resin 1.5% and carbon binder consisting of various cokes, pitches and carbon bearing organic liquids 19.17% was prepared. These ingredients were mixed in a conventional refractory mixer and extrusion pressures at various temperatures were measured using a modified Marshall tester used for extruding asphalt, commonly used in the asphalt industry. The die holding the material was maintained at a set temperature to maintain sample temperature. The default temperature for testing was 66° C. Test results are shown in the second column of Table III, pressures are shown in kilopascals (kPa).

Figure 4:
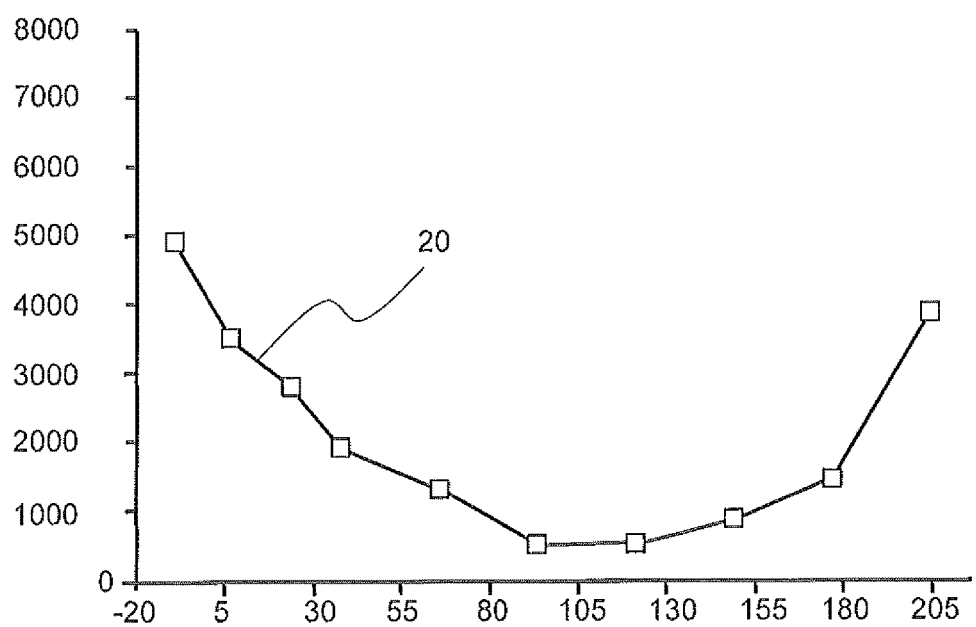
FIG. 4 is a plot of extrusion pressure of a sample of a prior art formulation with respect to temperature.

FIG. 4 is a graph depicting extrusion pressures as a function of temperature for this prior art formulation. Temperatures are shown in degrees Celsius on the horizontal axis. Pressures are shown in kilopascals (kPa) on the vertical axis. Plot 20 is a representation of pressure values. FIG. 4 shows that the temperature range in which the prior art formulation is viscoplastic and formable is very narrow compared to the inventive formulation.

Example IV

A test material, according to the present invention and containing no resin, composed of Chinese 90% alumina bauxite 52%, alumina 6%, silicon carbide 7.5%, carbon binder consisting of various cokes 11%, oleophilic rheology modifier 2% and propylene glycol 13% was prepared. These ingredients were mixed in a conventional refractory mixer and extrusion pressures at various temperatures were measured using a modified Marshall tester used for extruding asphalt, commonly used in the asphalt industry. The die holding the material was maintained at a set temperature to maintain sample temperature. The default temperature for testing was 66° C. Test results are shown in the third column of Table III; pressures are shown in kilopascals (kPa).

Figure 5:
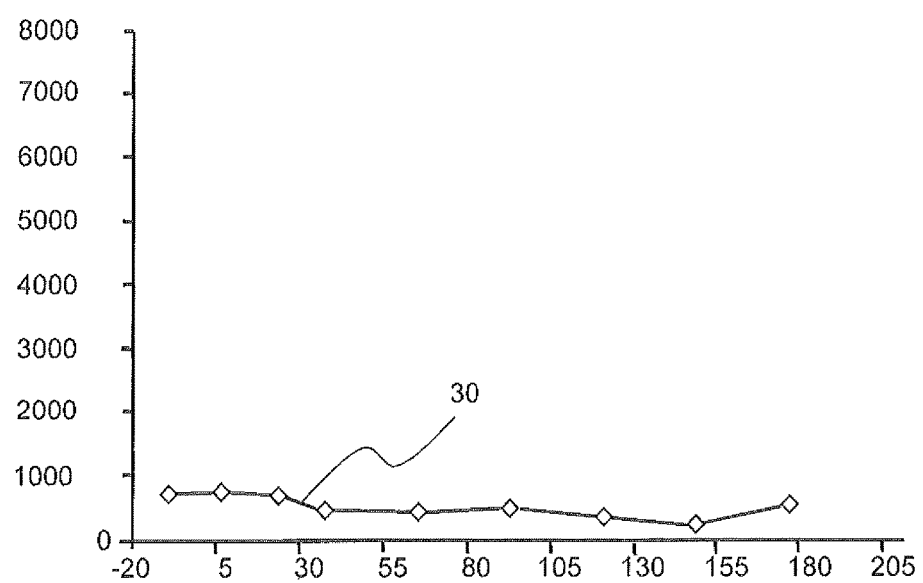
FIG. 5 is a plot of extrusion pressure of a sample of a resin-free formulation of the present invention with respect to temperature.

FIG. 5 is a graph depicting extrusion pressures as a function of temperature for this inventive formulation. Temperatures are shown in degrees Celsius on the horizontal axis. Pressures are shown in kilopascals (kPa) on the vertical axis. Plot 30 is a representation of pressure values. The pressure value observed above 180 degrees C. could not be measured because this was at a temperature higher than the boiling point of the liquid; therefore only solids are present. FIG. 5 shows that, when there is no interaction between the low viscosity liquid and any other part of the mix (such as a solvent action between the low viscosity liquid and carbon binder), the material will have a nearly constant extrusion pressure for a very wide range of temperatures.

Example V

A test material, according to the invention and containing resin and polymer, composed of Chinese 90% alumina bauxite 48%, alumina 6%, silicon carbide 7%, kyanite 89%, carbon binder consisting of various cokes 10%, resin 5%, polymer 2% and propylene glycol 14% was prepared. These ingredients were mixed in a conventional refractory mixer and extrusion pressures at various temperatures were measured using a modified Marshall tester used for extruding asphalt, commonly used in the asphalt industry. The die holding the material was maintained at a set temperature to maintain sample temperature. The default temperature for testing was 66° C. Test results are shown in the fourth column of Table III; pressures are shown in kilopascals (kPa).

Figure 6:
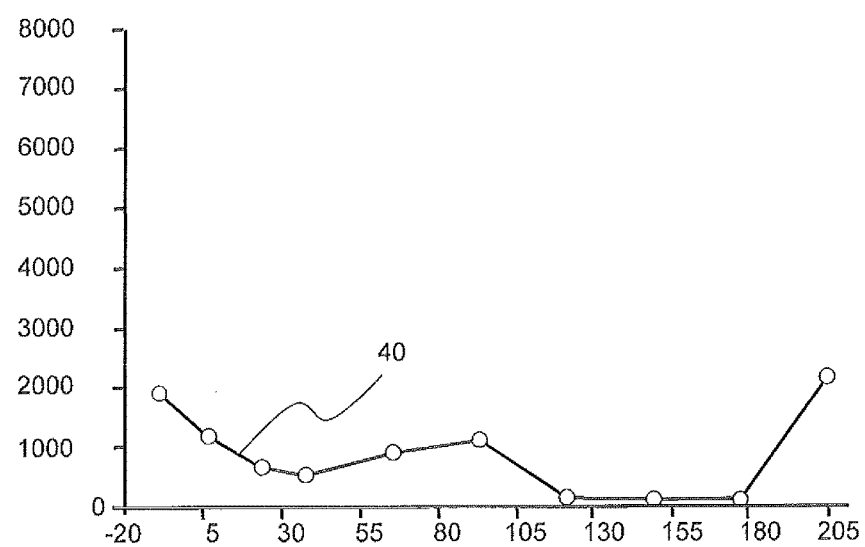
FIG. 6 is a plot of extrusion pressure of a sample of the formulation of the present invention, containing resin and polymer, with respect to temperature.

FIG. 6 is a graph depicting extrusion pressures as a function of temperature for this inventive formulation. Temperatures are shown in degrees Celsius on the horizontal axis. Pressures are shown in kilopascals (kPa) on the vertical axis. Plot 40 is a representation of pressure values. FIG. 6 displays a curve in which the line has a peak at 95° C. which is due to the polymer starting to be activated and polymerize. As the temperature is increased to 125° C., the polymer begins to melt again. As the temperature is increased to 180° C. the presence of the resin leads to pyrolization. The values below 2000 kPa for the extrusion pressure indicate that this formulation has properties similar to the inventive formula of Example II.

Example VI

A test material, according to the invention and containing tall oil, composed of Chinese 90% alumina bauxite 60%, alumina 3%, silicon carbide 22%, carbon binder containing carbon bearing organic solids and metals 6%, oleophilic rheology modifier 2%, polar organic activator 0.5% and tall oil 6.5% was prepared as shown in the fifth column of Table III. These ingredients were mixed in a conventional refractory mixer and extrusion pressures at various temperatures were measured using a modified Marshall tester used for extruding asphalt, commonly used in the asphalt industry. The die holding the material was maintained at a set temperature to maintain sample temperature. The default temperature for testing was 66° C. Test results are shown in the fifth column of Table III; pressures are shown in kilopascals (kPa).

Figure 7:
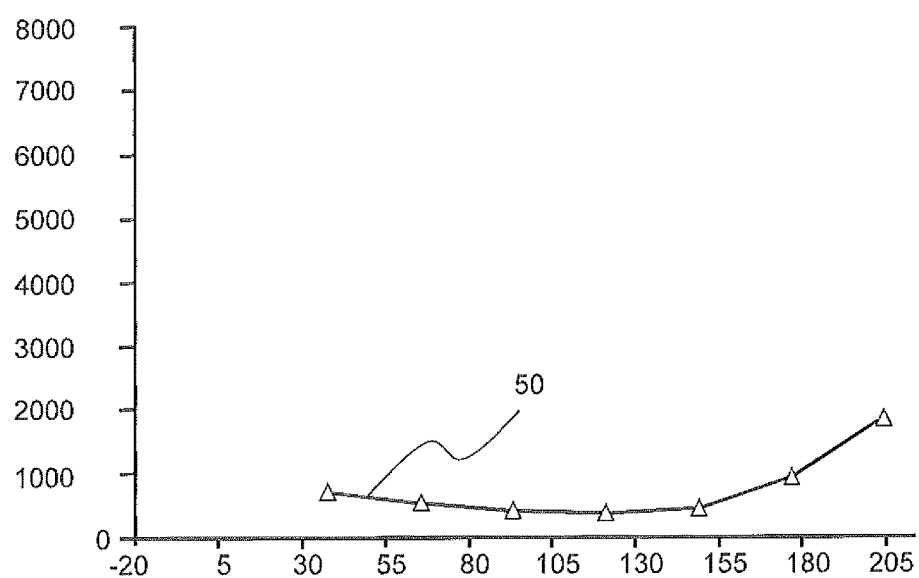
FIG. 7 is a plot of extrusion pressure of a sample of a formulation of the present invention, containing tall oil, with respect to temperature.

FIG. 7 is a graph depicting extrusion pressures as a function of temperature for this inventive formulation, which contains tall oil as a low viscosity solvent. Temperatures are shown in degrees Celsius on the horizontal axis. Pressures are shown in kilopascals (kPa) on the vertical axis. Plot 50 is a representation of pressure values. Plot 50 is nearly flat, and remains below the 2000 kPa level. Tall oil is not a polar organic solvent, so a small amount must be added in order to activate the oleophilic rheology modifier. Though there is no resin present in this formulation, it stiffens at temperatures above 180° C.

Example VII

Figure 8:
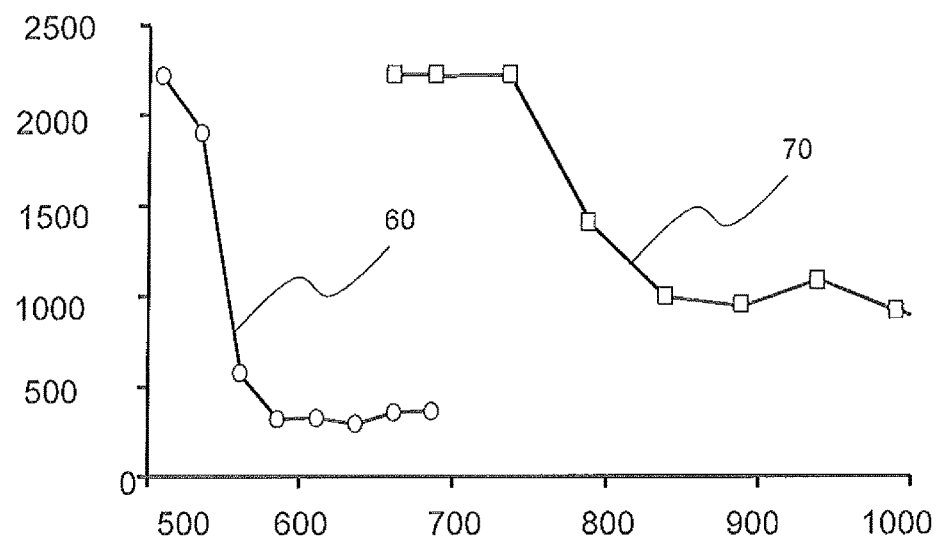
FIG. 8 is a plot of extrusion pressure of a sample of a formulation of the prior art and a sample of a formulation of the present invention, each with respect to mass of liquid added.

FIG. 8 shows experimental results for the prior art formulation and the inventive formulation described in Table I. Temperatures are shown in degrees Celsius on the horizontal axis. Pressures are shown in kilopascals (kPa) on the vertical axis. Plot 60 is a representation of pressure values for the prior art formulation containing 2 wt % conventional ball clay. Plot 70 is a representation of pressure values for the inventive formulation containing 2 wt % organic modified clay. These ingredients were mixed in a conventional refractory mixer and extrusion pressures at various liquid additions were measured using a modified Marshall tester used for extruding asphalt, commonly used in the asphalt industry. The die holding the material was maintained at a set temperature to maintain sample temperature. FIG. 8 shows that more liquid is needed to develop a coherent moldable mass for the inventive formulation than is required to develop a coherent moldable mass for the prior art formulation. The inventive formulation with the oleophilic rheology modifier exhibits less change in extrusion pressure as liquid content increases than does the prior art formulation.

The invention is also directed to the use of the inventive formulation as a tap hole closure material. In use, a clay gun or mud gun, loaded with the inventive formulation, is swung into a tap hole in a metallurgical vessel, and the inventive formulation is pushed into the tap hole until the tap hole is sealed.

A refractory aggregate system or formulation according to the invention may comprise a refractory aggregate, an anhydrous liquid and a rheology modifier. The anhydrous liquid may be selected from the group consisting of polyunsaturated fats, aliphatic hydrocarbons, aromatic hydrocarbons, alcohols, aldehydes, esters, ketones, and combinations thereof. The anhydrous liquid may be selected from the group consisting of tall oil, ethylene glycol, glycerin, propylene glycol, linseed oil, soybean oil, and combinations thereof. The anhydrous liquid may be present in the system or formulation in an amount in the range from and including 2 wt % to and including 40 wt % as a percentage of the total batch of liquids and solids. The anhydrous liquid may exhibit a change in viscosity that is less than a factor of 10 in response to a temperature change from 10 degrees C. to 100 degrees C. The oleophilic rheology modifier may be present in the formulation in an amount in the range from and including 0.2 wt % to and including 50 wt % as a percentage of the total formulation of liquids and solids. The oleophilic rheology modifier is selected from the group consisting of organoclays, phyllosilicates, smecities, hectorite, montmorillonite, and combinations thereof. The oleophilic rheology modifier may comprise organoclay. The refractory aggregate system or formulation may further comprise a polymer. The refractory aggregate system or formulation may further comprise a polyvinylpyrrolidone. The refractory aggregate may be selected from the group consisting of brown fused alumina, bauxite, clay, silica sand, silica, fumed silica, silicon carbide, and combinations thereof. The refractory aggregate may be present in the total formulation of liquids and solids in an amount in the range from and including 5 wt % to and including 90%. The weight ratio of oleophilic rheology modifier to anhydrous liquid in the refractory aggregate system or formulation may be equal to or between a ratio of 1 part modifier to 50 parts liquid and 1 part modifier to one part liquid. The refractory aggregate system or formulation may further comprise a carbon binder selected from the group consisting of coal tar, coal tar pitches, petroleum tar, petroleum tar pitches, phenolic resins, and combinations thereof. The refractory aggregate system or formulation may contain carbon binder in an amount ranging from and including 0.01 wt % to and including 20 wt % as measured in terms of the total formulation of liquids and solids. The refractory aggregate system or formulation may further comprise a metal-containing substance selected from the group consisting of aluminum, silicon, ferrosilicon, ferrosilicon nitride, titanium dioxide, and combinations thereof. The metal-containing substance may be present in the refractory aggregate system or formulation in an amount in the range from and including 0.01 wt % to and including 10 wt %, measured in terms of the total formulation of liquids and solids. The refractory aggregate may further comprise fumed silica. The fumed silica may be present in the refractory aggregate system or formulation in an amount in the range from and including 0.01 wt % to and including 10 wt %, measured in terms of the total formulation of liquids and solids.

Numerous modifications and variations of the present invention are possible. It is, therefore, to be understood that within the scope of the following claims, the invention may be practiced otherwise than as specifically described.

We claim:

1. A refractory aggregate system, comprising:
a refractory aggregate;
an anhydrous liquid;
an oleophilic rheology modifier; and
a carbon binder selected from the group consisting of coal tar, coal tar pitches, petroleum tar, petroleum tar pitches, phenolic resins, and combinations thereof;
wherein the anhydrous liquid is selected from the group consisting of tall oil, propylene glycol, linseed oil, soybean oil, and combinations thereof.

2. The system of claim 1, wherein the anhydrous liquid is present in the formulation in an amount in the range from and including 2 wt % to and including 40 wt % as a percentage of the total batch of liquids and solids.

3. The system of claim 1, wherein the anhydrous liquid exhibits a change in viscosity that is less than a factor of 10 in response to a temperature change from 10 degrees C. to 100 degrees C.

4. The system of claim 1, wherein the oleophilic rheology modifier is present in the formulation in an amount in the range from and including 0.2 wt % to and including 50 wt % as a percentage of the total batch of liquids and solids.

5. The system of claim 1, wherein the oleophilic rheology modifier is selected from the group consisting of organoclays, phyllosilicates, smectities, hectorite, montmorillonite, and combinations thereof.

6. The system of claim 1, wherein the oleophilic rheology modifier comprises organoclay.

7. The system of claim 1, wherein the anhydrous liquid comprises propylene glycol.

8. The system of claim 1, wherein the carbon binder comprises phenolic resins.

9. The system of claim 1, wherein the refractory aggregate is selected from the group consisting of brown fused alumina, bauxite, clay, silica sand, silica, fumed silica, silicon carbide, and combinations thereof.

10. The system of claim 1, wherein the refractory aggregate is present in the wet formulation in an amount in the range from and including 5 wt % to and including 90%.

11. The system of claim 1, wherein the weight ratio of oleophilic rheology modifier to anhydrous liquid is equal to or between a ratio of 1 part modifier to 50 parts liquid and 1 part modifier to one part liquid.

12. The system of claim 1, wherein the carbon binder comprises phenolic resins, and further comprises coke.

13. The system of claim 12, wherein the carbon binder is present in the wet formulation in an amount ranging from and including 0.01 wt % to and including 20 wt %.

14. The system of claim 1, further comprising a metal-containing substance selected from the group consisting of aluminum, silicon, ferrosilicon, ferrosilicon nitride, titanium dioxide, and combinations thereof.

15. The system of claim 14, wherein the metal-containing substance is present in the wet formulation in an amount in the range from and including 0.01 wt % to and including 10 wt %.

16. The system of claim 1, further comprising fumed silica.

17. The system of claim 16, wherein the fumed silica is present in the wet formulation in an amount in the range from and including 0.01 wt % to and including 10 wt %.

* * * * *